United States Patent Office 3,526,040
Patented Sept. 1, 1970

3,526,040
MEASURING INSTRUMENT
Sidney G. Young, 154 Blackfriars Road,
London, SE. 1, England
Filed May 3, 1968, Ser. No. 726,466
Int. Cl. G01b 3/08
U.S. Cl. 33—161                               8 Claims

ABSTRACT OF THE DISCLOSURE

A linear measuring instrument of two or more telescopic tubular staffs having alignable holes through which part of a pivotal lever constituting locking means is adapted to pass under spring influence when the staffs are extended and/or retracted. The optional provision of stops in the staffs, preferably blocks for mounting the pivotal levers, absorbs shocks when the retracted instrument is placed heavily on the ground. The holes in the or each outer staff of the instrument are preferably reinforced such as by a sleeve.

---

The invention relates to a linear measuring instrument comprising at least two telescopically engageable and preferably graduated tubular staffs which can be retracted one into the other or another when the instrument is not in use or for measuring short distances, and which can be releasably locked in a predetermined extended position for measuring longer distances.

The invention primarily aims to provide a sturdier and more accurate instrument with improved releasable locking means for a predetermined extended and/or retracted position of each staff.

According to the invention, the releasable locking means comprise a lever which is mounted in the or each inner staff for pivotal movement about an axis transverse to the longitudinal axes of the staffs, a first hole in the peripheral wall of the or each inner staff permitting part of the lever to pass therethrough, and a second hole at a predetermined position in the peripheral wall of the or each mating outer staff also permitting the said lever part to pass therethrough, spring means being provided to urge the lever part to project through both holes when the staffs are in a relative position at which the holes in the mating staffs are aligned.

When more than two staffs are comprised in the measuring instrument, it is preferred that each inner staff can be withdrawn from the same end of the outermost staff. It has been found that this facilitates handling of the instrument. It is also preferred that the aforementioned predetermined extended positions of the staffs correspond to the maximum desirable distance to which the staffs are to be extended without being entirely withdrawn one from the other. Such maximum distance will be determined by the amount of telescopic engagement that is still required in the extended positions to present a rigid instrument in which there is no danger of bending or kinking.

The part of the lever intended to project through the holes is preferably in the form of an integral terminal button and the spring means are desirably a compression spring acting on the lever from directly beneath the button. The button may be tapered to facilitate engagement and disengagement in and from the holes and for greater accuracy.

According to another perferred feature of the invention, the inner or intermost and the outer or outermost staffs respectively terminate in a replaceable hard ball end of, for example, hardened steel, so as to ensure that the staffs themselves are not prematurely damaged when abutted against rough surfaces serving as the data surfaces for measurement. The ball ends can be replaced when worn or exchanged for other measuring expedients such as calliper ends.

According to another aspect of the invention, provision is made to minimize displacement and/or distortion of the individual staffs when the retracted instrument is heavily placed or knocked on the ground or some other surface. For this purpose, a stop is provided in one end of the outer or outermost staff and in the complementary end of the or each inner staff, the stops being located such that, with the staffs retracted, the stops abut against one another and absorb any impact caused by placing the said one end on the ground. The stops are preferably in the form of metal plugs for the staffs and, in the case of the inner staff or staffs, may be blocks serving to carry the aforementioned pivoted levers.

According to yet another aspect of the invention, releasable locking means are provided to prevent unintentional extension of the or each inner staff from its retracted position. Such locking means may be similar to the means for locking the staffs in their extended position but it is desirable that the force necessary to release the locking means be weaker for the present purpose.

It has been found that the instrument can also suffer damage when it is handled roughly or misused whilst the, one or some of the inner staffs is or are in the predetermined extended position. In that case, the hole at the appropriate end in the peripheral wall of the or each outer staff is likely to become elongated by abutment with the button and as a result there will be excessive play between the button and said hole and the outer staff will no longer be accurately positioned with respect to the mating inner staff, thereby giving rise to inaccurate measurement. It would, of course, be possible to make each staff so robust that elongation of the hole by the button is impossible. However, it is a desirable feature of these measuring instruments that the staffs be thin-walled tubes that are light in weight and therefore not costly. Aluminium or an alloy thereof is particularly suitable because it does not corrode and is easy to mark with graduations.

According to another feature of the invention, therefore, the portion of the or each outer staff around the said second hole is reinforced, preferably by means of a sleeve that may be shrunk or welded thereon and has an aperture in alignment with the said second hole. The sleeve can be of the same material as the or each outer staff and the aperture therein may be formed at the same time as the said second hole is formed in the outer staff after the sleeve has been secured to the outer staff. In the case of an instrument having more than two staffs, the reinforcement should of course be sufficiently short so as not to interfere with the retraction of each outer staff into a further outer shaft.

Examples of the invention are illustrated in the accompanying diagrammatic drawings in which.

Figure 1:
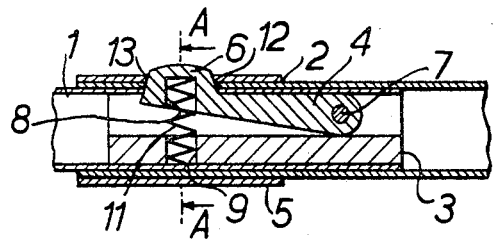
FIG. 1 is a fragmentary longitudinal section through the centre line of two releasably interlocked mating staffs of a measuring instrument.
Figure 2:
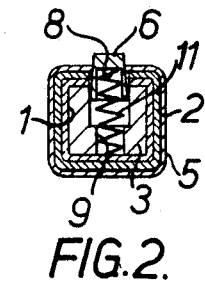
FIG. 2 is a cross-section taken on the line A—A in FIG. 1.
Figure 3:
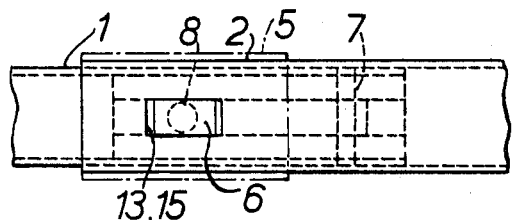
FIG. 3 is a fragmentary plan view of the parts of FIG. 1.

Referring to FIGS. 1 to 4, there is shown one end of an inner tubular staff 1 and the complementary end of a mating outer tubular staff 2 telescopically engaged therewith. The staffs cannot rotate relatively to each other because they are of rectangular, such as square, cross section, preferably of aluminium or an alloy thereof. The end of the staff 2 is reinforced by a sleeve or tube or ring 5 which can be of the same material as the staff 2, is welded or shrunk thereover and is sufficiently short so that, if the staff 2 were to be retracted into a further outer staff, the sleeve will remain projecting therefrom. Carried by a channel-section locating block 3 (also see FIG. 5) which is securely fixed in the tube 1 like a plug, there is a lever 4 which terminates in a rectangular-section peg or button 6 at one end and is pivoted at the other end about a pin 7 transverse to the coincident longitudinal axes of the tubes. The underface of the button 6 and the block 3 itself are recessed or apertured at 8 and 9, respectively, to form emplacements for a compression spring 11. The latter urges the button into engagement with rectangular holes 12, 13, 15, provided in the peripheral walls of the tubes 1, 2 and 5, respectively. The holes 13 and 15 may be formed simultaneously. The button has tapered sides. The important reason for this is that the button is thereby positioned accurately in the holes. If the buttons were not tapered, adequate clearance would be necessary with respect to the holes and such clearance, multiplied by the number of locking devices used in the entire instrument, could give rise to considerable error in the distances measured with the instrument.

Figure 4:
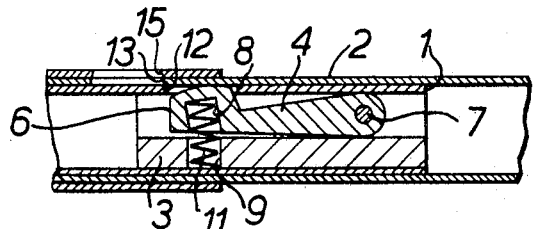
FIG. 4 is a view similar to FIG. 1 but with the locking means released.
Figure 5:
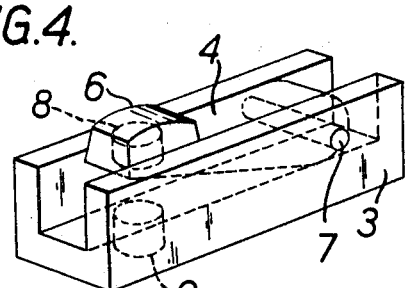
FIG. 5 is a detailed perspective view of the locking means.
Figure 6:
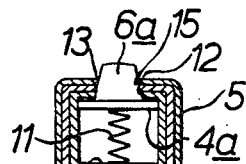
FIG. 6 is a cross-section through modified locking means.
Figure 7:
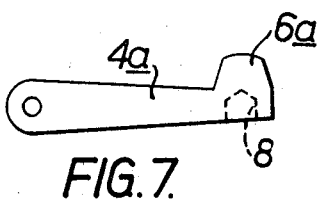
FIG. 7 is a side elevation of the lever blade employed in the modification of FIG. 6.

As evident from a comparison of FIGS. 1 and 4, when the inner tube 1 has been extended to a position in which the holes 12, 13 and 15 are aligned, the spring 11 causes the lever 4 to pivot about the pin 7 until the button 6 is engaged in the holes, as shown in FIG. 1. The sleeve 5 minimizes the possibility of deformation of the hole 13 by the button 6. To release the lever 4, finger or thumb pressure is applied to the button 6 to push it out of engagement with the holes and the inner tube 1 can be retracted again or moved in the opposite direction if it is desired to withdraw it completely from the outer tube 2.

The embodiment of FIGS. 6 to 10 employs modified locking means in which the primary feature is that the button 6a of a lever blade 4a is circular in section. Again, it has tapered sides (see FIGS. 6 and 7) for greater accuracy, to facilitate its engagement and disengagement with and from the now circular holes 12, 13, 15 and to obtain better contact between the button and the holes 13, 15. The circular holes are easier to form in the tubes than the rectangular holes required in FIGS. 1 to 5.

Figure 8:
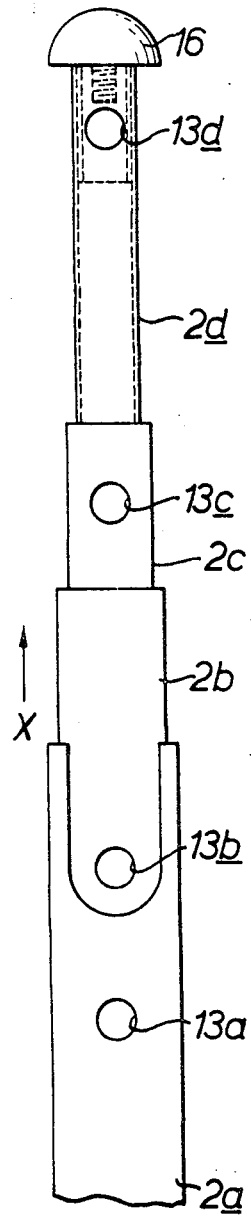
FIG. 8 is a fragmentary side elevation of the retracted measuring instrument employing the locking means of FIGS. 6 and 7 but omitting the reinforcing sleeves for clarity.
Figure 9:
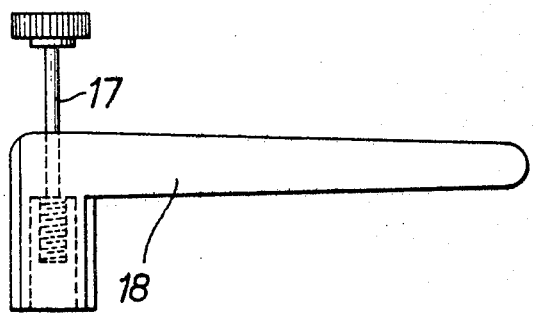
FIG. 9 is a fragmentary composite side elevation showing an inner and a mating outer staff of the instrument of FIG. 8, again without the reinforcement.

It will be appreciated that, in the more usual case where there are several telescopic staffs, each of the outer staffs is provided with an apertured sleeve as described above or some other reinforcement, but in a position where it will not interfere with the retraction of each such outer staff. The need for this become apparent on an inspection of FIG. 8 showing the collapsed or retracted positions of several staffs of an instrument. Although the reinforcement for the holes in the outer staffs has been omitted from FIG. 8 for clarity, it will be understood that only the exposed visible portions of the staffs 2a, 2b, 2c and 2d should be reinforced. In the case of most staffs, a reinforcing sleeve will be preferred but for the staff 2b a sleeve would interfere with the staff 2a and a small welded plate around the hole 13b will suffice.

Figure 10:
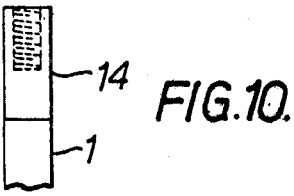
FIG. 10 is a fragmentary composite side elevation of the innermost staff of the FIG. 8 instrument but with the ball end removed and a calliper end about to be attached.

In FIG. 8, where all the inner staffs can be withdrawn from the same end of the outermost staff in the direction of the arrow X, only the repective holes in the outer staffs are visible as already mentioned. Thus, the hole 13a in the outermost tube 2a receives the button of locking means in the hidden (retracted) end of the next inner 2b if the latter is withdrawn sufficiently in the direction of the arrow X. Similarly, the hole 13b cooperates with the button of a lever in the next inner tube 2c, the hole 13c with a lever button in the tube 2d and the hole 13d with a lever button in the innermost tube 1 which is completely retracted in FIG. 8 but is visible in FIG. 10. This innermost tube terminates in a drilled and tapped block 14 for receiving the screw of a hardened ball end 16 (FIG. 8) or the screw-threaded end of a locking pin 17 on a socket-ended calliper fitting 18 (FIG. 10). The outermost tube 2a also terminates in a tapped block 14a (FIG. 11), a hardened steel ball end 16a being shown in position. Shapes other than hemispherical can be used for the replaceable end.

Figure 11:
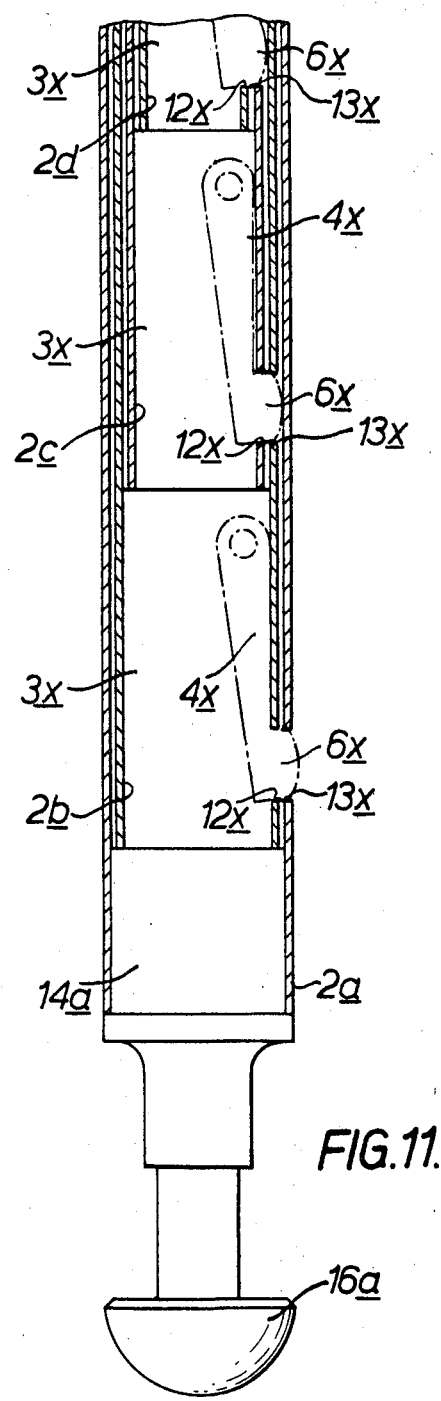
FIG. 11 is a fragmentary sectional side elevation of the retracted instrument of FIG. 8 but turned on its side and illustrating the opposite end when fitted with blocks of the FIG. 5 construction.

FIG. 11 also serves to illustrate a further aspect of the invention. The retracted ends of the inner tubes 2b, 2c, 2d, etc., are fitted with blocks 3x corresponding to the blocks 3 of FIG. 5 and serving as stops which abut against one another and against the block 14a in the retracted position of the instrument; they absorb any impact caused when placing the end 16a on the ground. The blocks 3x carry spring-influenced pivoted levers 4x corresponding to the levers 4 in FIG. 5 but terminating in integral tapered buttons 6x of circular cross-section releasably engageable in aligned holes 12x, 13x in the retracted staffs to avoid unintentional extension of the inner staffs.

It will now be evident that the buttons 6x of FIG. 11 serve as part of the means for releasably locking the staffs in a predetermined extended position as well as part of the means for releasably locking the retracted staffs. The only modification required to the FIG. 8 instrument is to make provision for an additional hole 13x in the or each outer staff so that, when staffs are retracted, the buttons engage in the holes 13x as shown in FIG. 11 and when they are extended they engage in the holes 13 or 13a to 13d located at the ends of the outer staffs visible in FIG. 8. In other words, each outer staff has two holes, one near each end of the staff, for co-operating with the button 6x and in addition each inner staff has a hole through which the button 6x may project. A desired weaker releasing force when the staffs are locked in the retracted position than when they are locked in the extended position can be obtained by the fact that the buttons 6x need not be as fully engaged with the holes 13x as they are with the holes at the other ends of the staffs. For example, in the case of the second button 6x from the bottom of FIG. 11, full engagement in the hole 13x in the staff 2b is prevented by the wall of the staff 2a. Also, there is no apertured reinforcement around the holes 13x.

I claim:

1. A linear measuring instrument comprising an outer tubular staff, and an inner tubular staff which can be telescopically retracted into said outer staff and releasably locked in a predetermined extended position, releasable locking means for the staffs comprising an elongated locating block fixed in said inner staff, a lever carried by said locating block, said locating block being greater in length than said lever and provided with an axially extending opening for receiving said lever, said lever being mounted for pivotal movement in said block about an axis transverse to the longitudinal axes of the staffs, a first hole in said inner staff permitting part of said lever to pass therethrough, a second hole at a predetermined position in said outer staff permitting said lever part to pass therethrough, and spring means for urging said lever part through both of said holes when the staffs are in a relative position at which the holes are in registry.

2. The instrument of claim 1 wherein said lever is formed with an integral terminal button adapted to extend through said holes.

3. The instrument of claim 2 wherein said spring means comprises a compression spring located directly beneath said button.

4. The instrument of claim 3 wherein the underface of said button is formed with a recess and said block is formed with an opening for receiving said compression spring.

5. The instrument of claim 1 further including a stop in one end of said outer staff and a stop in the complementary end of said inner staff, said stops being located such that, with the staffs retracted, the stops abut against one another and absorb any impact caused by placing the said one end on the ground.

6. The instrument of claim 5 further including releasable locking means to prevent unintentional extension of the inner staff from its retracted position.

7. The instrument of claim 6 wherein the stop for the inner staff is constituted by said locating block and said lever also forms part of the releasable locking means for the retracted position of the inner staff, a further hole being provided in said outer staff permitting part of said lever to pass therethrough when the inner staff is retracted.

8. A linear measuring instrument comprising an inner tubular staff, an outer tubular staff and at least one intermediate tubular staff all of which are telescopically interengageable and which can be retracted one into another and releasably locked in a predetermined extended position, releasable locking means for the staffs comprising an elongated locating block fixed in each of said inner and intermediate staffs, a lever carried by each of said locating blocks, each of said locating blocks being greater in length than the lever associated therewith and provided with an axially extending opening for receiving the lever, each of said levers being mounted for pivotal movement in said blocks about an axis transverse to the longitudinal axes of the staffs, a first hole in said inner and intermediate staffs permitting part of the lever associated therewith to pass therethrough, a second hole at a predetermined position in said intermediate and outer staffs permitting the said lever part associated therewith to pass therethrough, and spring means for urging said lever parts through both holes when the staffs are in a relative position at which the holes are in registry.

References Cited

UNITED STATES PATENTS

| | | | |
|---|---|---|---|
| 859,233 | 7/1907 | Lane | 248—408 |
| 1,312,485 | 8/1919 | Krauth | 248—408 |
| 1,985,527 | 12/1934 | Taylor | 33—161 |
| 3,347,575 | 10/1967 | Morris | 285—303 |

WILLIAM D. MARTIN, Jr., Primary Examiner

U.S. Cl. X.R.

287—58